United States Patent [19]

Hirota et al.

[11] 4,364,098
[45] Dec. 14, 1982

[54] MULTIPLE-CHANNEL ROTARY TRANSFORMER CIRCUIT IN A MAGNETIC RECORDING AND/OR REPRODUCING APPARATUS

[75] Inventors: Akira Hirota, Chigasaki; Masaharu Tsunekawa, Yokohama, both of Japan

[73] Assignee: Victor Company of Japan, Ltd., Yokohama, Japan

[21] Appl. No.: 129,336

[22] Filed: Mar. 11, 1980

[30] Foreign Application Priority Data

Mar. 14, 1979 [JP] Japan .......................... 54/31697[U]

[51] Int. Cl.³ ............................................ G11B 15/14
[52] U.S. Cl. ...................................... 360/108; 360/64
[58] Field of Search .......................... 360/108, 64, 10; 323/264, 347, 348

[56] References Cited

U.S. PATENT DOCUMENTS 3,838,451 9/1974 Mino ..................................... 360/64
4,040,101 8/1977 Wellner et al. ...................... 360/64
4,197,562 4/1980 Kikuya et al. ....................... 360/64

Primary Examiner—Robert S. Tupper
Attorney, Agent, or Firm—Louis Bernat

[57] ABSTRACT

A multiple-channel rotary transformer circuit is used in a magnetic recording and/or reproducing apparatus provided on a rotary structure with a plurality of sets of rotary magnetic heads, each set comprising at least two rotary magnetic heads, and having a signal recording and reproducing circuit associated with the rotary magnetic heads. The rotary transformer circuit comprises a rotary transformer comprising a rotor having a plurality of groups of coils respectively connected to the individual rotary magnetic heads of the plurality of sets of rotary magnetic heads and rotating together with said rotary structure, and a stator having coils disposed to respectively confront corresponding coils of the rotor thereby to carry out transfer of signals between the coils of the rotor and the coils of the stator, and switches changed over in accordance with a selected mode of signal recording and reproducing and operating to short-circuit the both ends of each of the stator coils confronting the coils of the rotor connected to the rotary magnetic heads of sets not being used out of the plurality of sets of rotary magnetic heads and, at the same time, to substantially close, with respect to the signal recording and reproducing circuit, the coils of the stator confronting the coils of the rotor connected to the set of rotary magnetic heads being used.

2 Claims, 5 Drawing Figures

MULTIPLE-CHANNEL ROTARY TRANSFORMER CIRCUIT IN A MAGNETIC RECORDING AND/OR REPRODUCING APPARATUS

BACKGROUND OF THE INVENTION

The present invention relates generally to rotary transformer circuits in magnetic recording and/or reproducing apparatuses having rotary magnetic heads. More particularly, the invention relates to a multiple-channel transformer which is provided with coils in correspondence with rotary magnetic heads of a plurality of channels, and in which the interval between the coils is made small, and, moreover, signals can be obtained without cross-talk from other channels.

Heretofore, a so-called two-head type, helical-scanning magnetic recording and/or reproducing apparatus, in which video signals are recorded and reproduced alternately by a pair of rotary magnetic heads on and from a magnetic tape along tracks that are obliquely orientated relative to the longitudinal direction of the magnetic tape, have been widely reduced to practice. In a magnetic recording/reproducing apparatus of this two-head type, however, there is a need for an organization of means by which, with respect to tapes of the same length, recording and reproducing can be carried out with different modes of recording/reproducing time such as, for example, 2 hours and 6 hours.

In this case, for the 2-hour recording and reproducing mode, the magnetic tape is driven at a travel speed for 2 hours, and recording and reproducing are carried out with a pair of magnetic heads for 2-hour use. On the other hand, in the case where the apparatus is set for the 6-hour mode for long-time recording or reproducing, the magnetic tape is driven at a slow speed for 6 hours, and recording or reproducing is accomplished with a pair of magnetic heads for 6-hour use of narrower track width than that of the heads for 2-hour use. For this reason, in a magnetic recording/reproducing apparatus in which the recording or reproducing time can be changed in the above described manner, a pair of rotary magnetic heads for 2-hour use and another for 6-hour use, or a total of two pairs of rotary magnetic heads are used.

Furthermore, in the case when changed-speed reproduction of a signal at a specific speed which is different from that at the recording of that signal (for example, double speed quick motion or one half speed slow motion) is required, a pair of rotary magnetic heads exclusively for changed-speed reproduction mounted at different height positions are provided in addition to the pair of recording and/or reproducing rotary magnetic heads.

A magnetic recording/reproducing apparatus wherein a plurality of pairs of rotary magnetic heads are provided on a rotary structure, and, of these, only one pair of rotary magnetic heads are changed over and used according to a selected mode is being developed and reduced to practice.

On one hand, in a magnetic recording/reproducing apparatus in which rotary magnetic heads are used, in general, a rotary transformer is used for the transfer of signals between the rotary magnetic heads and the electrical circuit on the stationary side. This rotary transformer is mounted on the rotary structure on which the rotary magnetic heads are mounted and comprises a rotor comprising a disc-shaped core and coils formed thereon in a concentric circular arrangement and connected to the rotary magnetic heads, and a stator comprising a disc-shaped core and coils formed thereon in a concentric circular arrangement so as to confront the coils of the rotor.

A rotary transformer in a magnetic recording/reproducing apparatus of the type in which, of the above mentioned plurality of magnetic heads, one pair of magnetic heads is selectively used is of a multiple-channel organization in which coils are disposed in correspondence with the magnetic heads (four coils being used in the case where two pairs of magnetic heads are employed). The circuit of a multiple-channel rotary transformer of this kind has a circuit organization wherein the coils are provided in parallel connection, and, between each coil and an amplifier, an ON-OFF switch is individually provided therefor and is connected thereto. In accordance with the recording/reproducing mode, the switch corresponding to the pair of magnetic heads to be used is closed, and the switches corresponding to the pairs of magnetic heads not used are opened to open the circuit.

If a multiple-channel rotary transformer were to be constructed to have an increased number of coils with a conventional circuit organization as it is, the resulting structure would be disadvantagiously large. Particularly in a magnetic recording and reproducing apparatus for home use, the diameter of the rotary drum on which the rotary magnetic heads are mounted is standardized at a relatively small value, and it is difficult to use a large multiple-channel rotary transformer. Accordingly, a possible solution to this problem would appear to be to make the diameter of the disc of the rotary transformer small in order to install it within a guide drum of this small size and to reduce the interval between the coils disposed in a concentric circle.

However, if the interval between the coils is made small with the above mentioned circuit connection arrangement as it is, at the time of reproduction, for example, cross-talk will be disadvantageously produced to a degree which is not negligible from the coils of the channels of the pairs of magnetic heads not in use to the coils of the channel of the pair of magnetic heads in use.

SUMMARY OF THE INVENTION

Accordingly, it is a general object of the present invention to provide a novel and useful multiple-channel rotary transformer circuit in a magnetic recording and/or reproducing apparatus, in which circuit the above described problems have been overcome.

Another and specific object of the invention is to provide, in a magnetic recording/reproducing apparatus in which a plurality of sets of rotary magnetic heads in which each set comprises at least two rotary magnetic heads are provided, and the rotary magnetic heads of a selected set are put to use, a multiple-channel rotary transformer in which, of the coils of the channels corresponding to the rotary magnetic heads, the coils of the channels corresponding to the rotary magnetic heads of the sets not being used are short-circuited. By this feature of the multiple-channel rotary transformer according to the present invention, cross-talk of signals is prevented between the coils of channels corresponding to sets of rotary magnetic heads not being used and the coils of the channel corresponding to the set of rotary magnetic heads being used.

Other objects and further features of the present invention will be apparent from the following detailed description with respect to a preferred embodiment of the invention when read in conjunction with the accompanying drawings.

DETAILED DESCRIPTION

Figure 1:
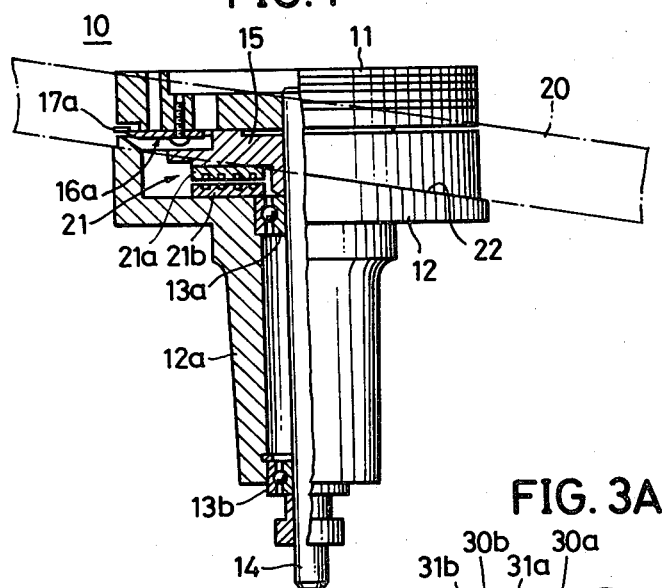
FIG. 1 is an elevation, with parts cut away and parts shown in vertical section, of one example of a guide drum assembly of a magnetic recording/reproducing apparatus, in which guide drum, the multiple-channel rotary transformer circuit according to the invention can be applied.

One example of a guide drum assembly of a magnetic recording/reproducing apparatus in which guide drum assembly the circuit of the present invention can be applied will be first described in conjunction with FIG. 1.

A guide drum assembly 10 comprises, essentially, a rotary guide drum 11 and a stationary or fixed guide drum 12 positioned thereunder. On the lower side of the fixed guide drum 12, a housing part 12a is formed integrally and coaxially therewith. This housing part 12a has a hollow interior, in which are supported bearings 13a and 13b coaxially aligned with the fixed guide drum 12. A rotary shaft 14 extends coaxially through the centers of the fixed guide drum 12 and the housing part 12a and is rotatably supported by the bearings 13a and 13b. The rotary guide drum 11 is coaxially mounted on a flywheel 15 coaxially fixed to the rotary shaft 14. The rotary shaft 14 is rotated by a head motor (not shown) at a specific rotational speed of, for example, 30 rotations per second (rps.).

Figure 2:
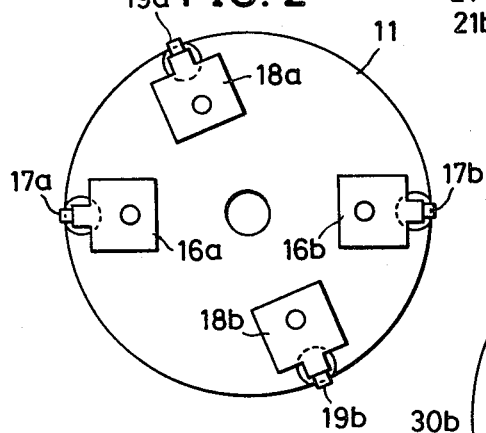
FIG. 2 is a bottom view of a rotary drum of the guide drum assembly shown in FIG. 1.

On the lower surface of the rotary guide drum 11 at the outer peripheral part thereof, as shown in FIG. 2, a first pair of rotary magnetic head assemblies 16a and 16b are mounted on diametrically opposite sides of the guide drum. These magnetic head assemblies 16a and 16b, at their outer sides, respectively have head tips 17a and 17b directed radially outward and projecting slightly beyond the outer periphery of the drum 11. Similarly, a second pair of rotary magnetic head assemblies 18a and 18b respectively having head tips 19a and 19b on their outer sides are mounted on the drum 11 on diametrically opposite sides at angular positions different from those of the first pair of magnetic head assemblies 16a and 16b.

The rotary magnetic head assemblies 16a and 16b, for example, are used at the time of a 2-hour recording/reproducing mode of operation, while the rotary magnetic head assemblies 18a and 18b, the track width of whose head tips 19a and 19b is less than the track width of the head tips 17a and 17b, are used at the time of a 6-hour recording/reproducing mode. These rotary magnetic head assemblies may be so adapted that the magnetic head assemblies 16a and 16b are used for ordinary recording/reproducing while the magnetic head assemblies 18a and 18b are used for changed-speed reproduction.

A lead 22 for guiding a magnetic tape 20 is provided in a helical state around one part of the outer peripheral surface of the fixed guide drum 12. As it is guided by the lead 22 of the guide drum assembly 10 of the above described construction, the magnetic tape 20 travels in wrapping contact around the guide drums 11 and 12 over an angular expanse thereof which is slightly greater than one half of the circumference thereof. As the rotary guide drum 11 rotates, a video signal is recorded on or reproduced from the magnetic tape 20 along oblique tracks alternately by head tips 17a and 17b (or 19a and 19b) of the rotary magnetic head assemblies 16a and 16b (or 18a and 18b).

Figure 3A:
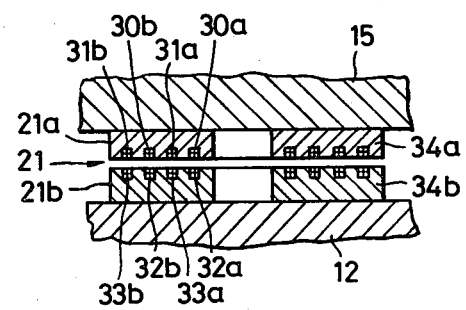
FIG. 3A is a vertical section of one example of the multiple-channel rotary transformer jot the guide drum assembly shown in FIG. 1.
Figure 3B:
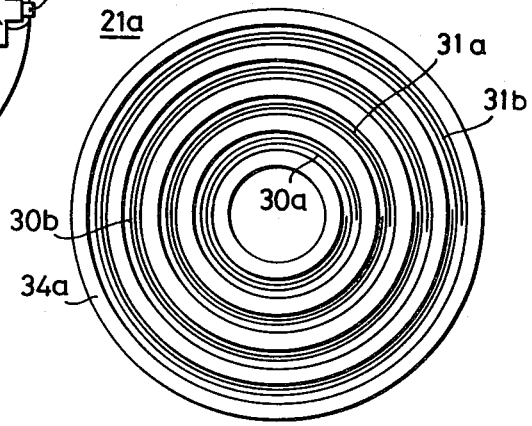
FIG. 3B is a bottom plan view of the upper disc (a rotor) of the rotary transformer shown in FIG. 3A.

A multichannel rotary transformer 21, which is interposed between the aforementioned flywheel 22 and fixed guide drum 12, has a rotor 21a secured coaxially to the flywheel 15 and a stator 21b secured coaxially to the fixed guide drum 12. As shown in FIGS. 3A and 3B, coils 30a and 30b and coils 31a and 31b are alternately disposed in concentric circular arrangement embeddedly in a disc-shaped core 34a of the rotor 21a. The stator 21b has a construction similar to that of the rotor 21a and is provided with coils 32a, 32b, 33a, and 33b alternately disposed in concentric circular arrangement embeddedly in a disc-shaped core 34b at positions to respectively confront the coils 30a, 30b, 31a, and 31b of the rotor. The rotor 21a and stator 21b are of a relative compact construction, and the interval or spacing between adjacent coils is, for example, of the order of 2 mm., which is very small in comparison with that of a conventional rotary transformer.

Figure 4:
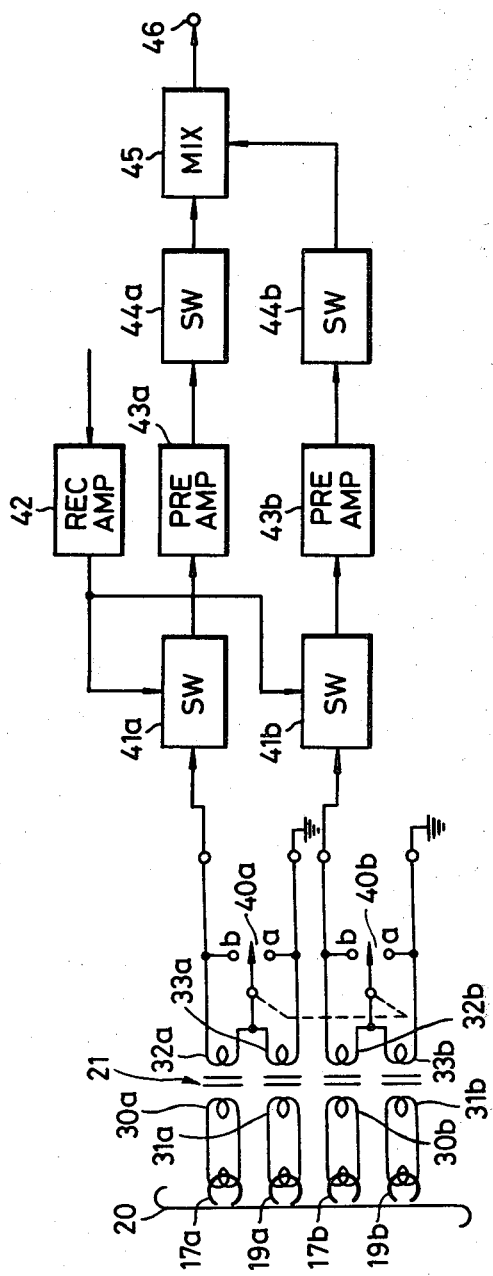
FIG. 4 is a circuit diagram, partly in block-diagram form, showing one embodiment of the multiple-channel rotary transformer circuit according to the invention.

The coils of the stator 21b are electrically connected as indicated in FIG. 4. More specifically, the coils 32a and 33a are connected in series between ground (earth) and a switcher 41a. Further, the movable contact of a switch 40a is connected to the junction between the coils 32a and 33a. This movable contact undergoes changeover switching operation between a fixed contact a which is grounded (earthed) and a fixed contact b connected to the switcher 41a. Similarly, the coils 32b and 33b are connected in series between ground and a switcher 41b. To the junction between the coils 32b and 33b, the movable contact of a switch 40b is connected. This movable contact undergoes changeover switching operation between a grounded fixed contact a and a fixed contact b connected to the switcher 41b. The switches 40a and 40b are actuated to perform changeover switching operation interrelatedly with a mode changeover switch (not shown).

Then, in the case where a magnetic tape recorded with a 2-hour mode, for example, is to be reproduced, the above mentioned mode changeover switch is operated to change the mode oven to the 2-hour mode reproduction, whereby the movable contacts of the switches 40a and 40b are interrelatedly actuated and are switched and placed into contact with their respective fixed contacts a. As a consequence, the coils 32a and 32b on their one side are grounded by way of the switches 40a and 40b, while the coils 33a and 33b are respectively short-circuited across their both ends.

A signal reproduced from the magnetic tape 20 by the head tips 17a and 17b of the first pair of rotary magnetic head assemblies 16a and 16b is transmitted by way of the coils 30a, 32a, 30b, and 32b of the rotary transformer 21 to the switchers 41a and 41b. At the time of reproducing mode of operation, the switchers 41a and 41b send out the reproduced signal from the coils to preamplifiers 43a and 43b. The signals which have passed therethrough are led out alternately as signals for each field of a video signal by switchers 44a and 44b operating alternately. These signals are mixed in a mixer 45, and a continuous reproduced signal is led out through an output terminal 46.

During this operation, since the two terminals of each of the coils 33a and 33b are short-circuited, the signal reproduced by the head tips 19a and 19b of the second pair of rotary magnetic head assemblies 18a and 18b is not obtained at the coils 33a and 33b. Therefore, even if the interval between the adjacent coils is small, there is no undesirable occurrence such as the generation of an undesirable signal in the coils 33a and 33b, which leaks into the coils 32a and 32b, and an excellent reproduced signal without cross-talk is obtained.

On the other hand, in the case where a magnetic tape recorded with a 6-hour mode, for example, is to be reproduced, the above mentioned mode changeover switch is operated to change the mode over to the 6-hour mode reproduction, whereby the movable contacts of the switches 40a and 40b are interrelatedly actuated and are switched and placed into contact with their respective fixed contacts b. As a result of the operation of the above mentioned mode changing-over switch, the magnetic tape 20 is driven at a travel speed corresponding to the 6-hour mode, which is slower than the above mentioned 2-hour mode speed. The coils 33a and 33b on their one side are grounded by way of the switches 40a and 40b, while the coils 32a and 32b are respectively short-circuited across their both ends.

A signal reproduced from the magnetic tape 20 by the head tips 19a and 19b of the second pair of rotary magnetic head assemblies 18a and 18b is transmitted by way of the coils 31a, 33a, 31b, and 33b of the rotary transformer 21 to the switchers 41a and 41b. The reproduced signals passed through the switchers 41a and 41b, preamplifiers 43a and 43b, and switchers 44a and 44b are mixed in the mixer 45, whereby a continuous reproduced signal is led out through the output terminal 46.

During this operation, since the two terminals of each of the coils 32a and 32b are short-circuited, the signal reproduced by the head tips 17a and 17b of the first pair of rotary magnetic head assemblies 16a and 16b is not obtained at the coils 32a and 32b. Therefore, there is no undesirable occurrence such as the generation of an undesirable signal in the coils 32a and 32b, which leaks into the coils 33a and 33b, and an excellent reproduced signal without cross-talk is obtained.

At the time of the recording mode, the switchers 41a and 41b supply the recording signal from a recording amplifier 42 to the coils 32a and 32b or to the coils 33a and 33b.

In the above described embodiment of the invention, the mounting of the rotary magnetic head assemblies is not limited to that on the rotary drum. These magnetic head assemblies may be mounted on a rotary structure such as a rotary disc which is adapted to rotate between upper and lower stationary guide drums.

Further, this invention is not limited to these embodiments but various variations and modifications may be made without departing from the scope of the invention.

What we claim is:

1. A rotary transformer circuit in a magnetic recording and/or reproducing apparatus including a rotary structure with first and second sets of rotary magnetic heads which are used alternatively during either a signal recording or a reproducing mode, each head set comprising at least two rotary magnetic heads, and including a signal recording and reproducing circuit associated with the rotary magnetic heads, said rotary transformer circuit comprising:

rotary transformer means comprising a rotor having first and second groups of coils disposed thereon in a concentric circular arrangement, each group of said coils including two coils which are paired with a corresponding two coils of the other group of coils, each of said paired coils constituting a separate set of coils, said coils being respectively connected to the individual rotary magnetic heads of the first and second sets of rotary magnetic heads, and said coils and heads rotating together with the rotation of said rotary structure, each of the first group of said coils and each of the second group of said coils adjoining each other, and a stator having first and second groups of coils disposed in a concentric circular arrangement to respectively confront corresponding coils of the rotor, thereby to inductively transfer signals between the coils of the rotor and the coils of the stator; and switching means comprising first and second switches, each of said switches comprising two fixed contacts and a movable contact, said movable contact being operable to switch in a changeover action between the fixed contacts in accordance with a selection of either a signal recording mode or a signal reproducing mode, each of the coils of one set of coils of said first and second group being connected, at one end, to the signal recording and reproducing circuit and to the fixed contacts on one side of the first and second switches, and each of the coils of the other set of the first and second group being connected, at one end, to the other ends of said one set of coils and to the respective movable contacts of the first and second switches, and at its other end, to ground and to the other fixed contacts of each of the first and second switches.

2. A rotary transformer circuit as claimed in claim 1 in which the rotary structure is a rotary guide drum, the magnetic recording/reproducing apparatus further having a stationary guide drum constituting a pair with the rotary guide drum and guiding the magnetic tape in its travel as the magnetic tape travels in a helically wrapped state around the guide drums, both the rotor and the stator of the rotary transformer having a disc-shaped core, and the coils being disposed in a concentric circular arrangement on the surfaces of respective cores.

* * * * *